United States Patent [19]
Gyugyi et al.

[11] 3,852,654
[45] Dec. 3, 1974

[54] CYCLOCONVERTER SYSTEM INCLUDING MEANS TO DERIVE A CONTROL SIGNAL REPRESENTING FUNDAMENTAL CONVERTER OUTPUT

[75] Inventors: Laszlo Gyugyi; Eric J. Stacey, both of Pittsburgh, Pa.

[73] Assignee: Westinghouse Electric Corporation, Pittsburgh, Pa.

[22] Filed: Apr. 11, 1972

[21] Appl. No.: 242,988

[52] U.S. Cl. .................................. 321/7, 321/69 R
[51] Int. Cl. ........................................... H02m 5/30
[58] Field of Search ................. 321/7, 60, 61, 69 R; 323/20

[56] References Cited
UNITED STATES PATENTS

| | | | |
|---|---|---|---|
| 3,148,324 | 9/1964 | Peaslee et al. | 321/69 R |
| 3,356,930 | 12/1967 | Lupoli et al. | 323/20 |
| 3,475,702 | 10/1969 | Ainsworth | 321/69 R |
| 3,568,033 | 3/1971 | Gyugyi | 321/7 |
| 3,593,106 | 7/1971 | Lafuze | 321/7 |

Primary Examiner—A. D. Pellinen
Attorney, Agent, or Firm—G. H. Telfer; A. T. Stratton

[57] ABSTRACT

To permit detection of zero crossing points of the fundamental component of the cycloconverter output current a signal is derived that is the vectorial sum of a current proportional to alternating current in the shunt branch of the cycloconverter output filter and a current proportional to the alternating current in the load. The control signal so developed accurately represents, under steady state as well as transient load conditions, the output current wave of the converter without the characteristic ripple content and is useful for various control functions in cycloconverters.

3 Claims, 2 Drawing Figures

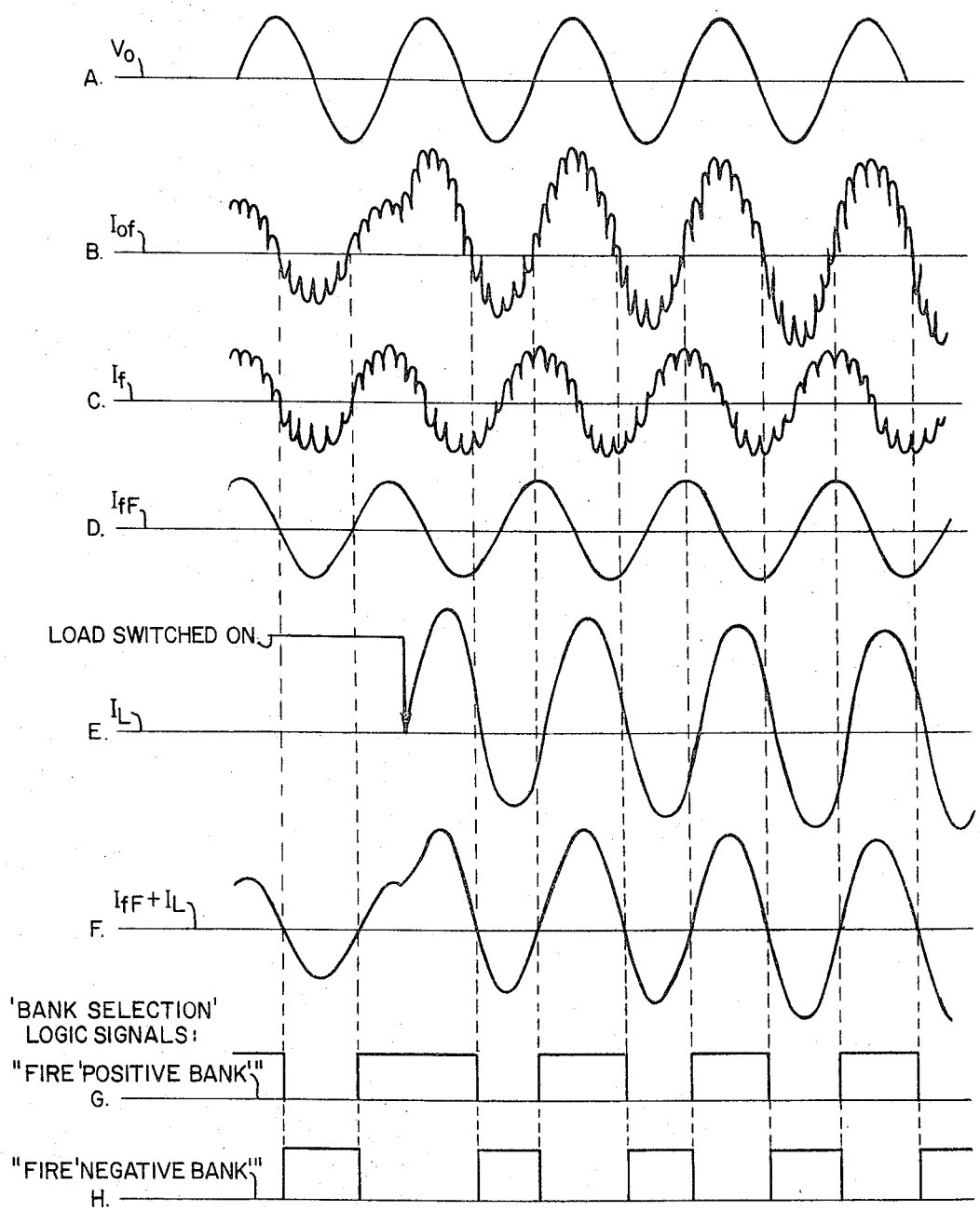

CYCLOCONVERTER SYSTEM INCLUDING MEANS TO DERIVE A CONTROL SIGNAL REPRESENTING FUNDAMENTAL CONVERTER OUTPUT

BACKGROUND OF THE INVENTION

The invention relates to cycloconverter apparatus for delivering controlled frequency a.c. power to a load from a source of a.c. power at a different or varying frequency.

Cycloconverters are known that have positive and negative banks of gate controlled switching elements which are gated by firing circuits to convert a first alternating voltage wave from a source into a second alternating waveform. The second alternating waveform characteristically includes a desired fundamental frequency component and undesired components having frequencies differing from that of the fundamental. These components will be referred to as "harmonics" with the understanding that their frequencies are not necessarily integral multiples of the desired fundamental output frequency. The harmonics may be substantially removed by a filter so that only the fundamental is applied to the load.

Various control functions are desired in cycloconverters. Among these is the control of the firing circuits to transfer the conduction between the positive and negative banks of the converter at the zero crossing points of the a.c. output current to insure continuous flow of essentially sinusoidal current to the load. Pat. No. 3,568,033, Mar. 2, 1971, by L. Gyugyi, discloses apparatus for that control function by detecting the occurrence of zero crossing points of the fundamental component of the a.c. output current waveform of the cycloconverter. A bank selector circuit that is responsive to the detected zero crossing points controls the conduction of the positive and negative banks of switching elements by initiating firing signals at desired times relative to the zero crossing points. In this way, simultaneous conduction of banks is not allowed in order to avoid interbank circulating currents.

In Pat. No. 3,568,033, the zero crossing points are detected by developing a signal proportional to the fundamental component of the cycloconverter output current. For this purpose a current transformer is located on the conductor leading from the banks of switching elements, before reaching the shunt filter capacitor. The output current in the conductor at that point includes the desired fundamental component and also harmonic (or "ripple") components. Ripple harmonics of relatively high frequency are generated by the normal waveform fabrication process and therefore they are characteristically present in the outputs of cycloconverters. These interfere with detecting zero crossings of the fundamental current component and so the current sensed by the current transformer is filtered before use as a control signal.

The above described technique of Pat. No. 3,568,033 has been successfully practiced and permits accurate detection of zero crossings of the fundamental under steady state conditions. However, a different need arises during times when there are transients in the system due to load variations such as occur when a load is either applied or removed. At such times, the converter current changes rapidly in what is referred to as a "step" change. This causes new harmonics or signal distortion that are in addition to the inherent cycloconverter ripple harmonics. To provide continuous output current, the harmonics generated by load transients must be included in the signal used for zero crossing detection and subsequently for bank selection. Yet the technique of Pat. No. 3,568,033 does not permit this. In that technique, the filter used to filter ripple harmonics from the sensed current waveform will also attenuate and phase shift the components resulting from load transients. This falsifies the zero crossing points of the actual output current and can therefore result in incorrect bank selection.

In the specific embodiment shown and described in Pat. No. 3,568,033, which should be referred to for a better understanding of the background of the present invention, current transformer 32 (FIG. 2) is that which provides the signal from which zero crossings are detected. The signal from that current transformer is filtered by filter 38 and then applied to bank selected control circuit 30. An additional current transformer 60 is shown sensing current through the load. The load current so sensed is merely used to develop a D.C. bias voltage, not for reconstructing the cycloconverter fundamental, for considerations that are quite apart from the matter of zero crossing detection.

Another patent that is relevent in subject matter to the present invention is Pat. No. 3,593,106, July 13, 1971, by D. L. Lafuze.

Pat. No. 3,593,106 relates to a cycloconverter in which a desired "safety margin" is provided against circulating currents between the positive and negative banks by appropriate biasing of their output levels. The system uses a means for reconstructing the fundamental waveform to permit sensing zero crossing points.

SUMMARY OF THE INVENTION

The present invention improves on the prior art by providing apparatus for accurately reconstructing the fundamental frequency waveform of a cycloconverter, without irrelevant ripple harmonics but with harmonics or distortion resulting from load transients. The reconstructed fundamental current wave signal is useful to determine the actual positive and negative half cycle intervals of the output current for various other control purposes in cycloconverters.

The present invention came about by recognizing the desired control signal cannot be practicably obtained directly. It can, however, be synthesized or reconstructed by combining two signals that can be directly sensed. These are (1) the alternating current in the shunt branch of the output filter of the cycloconverter and (2) the alternating load current.

Signal (1) can be obtained directly from the current flowing in the shunt filter capacitor and in its raw form it includes a fundamental component, which is a fraction of the total fundamental output current, and practically all undesired ripple harmonics but without any components with significant magnitude which represent load transients. Filtering the raw signal (1) produces a copy of the fundamental current flowing in the shunt filter capacitor, which, due to the regulated output voltage, does not change significantly during load transients.

Signal (2) can be sensed directly in the load circuit branch and thus it is proportional to the total load current which includes a fundamental component without ripple harmonics, and the components generated by load transients. By itself signal (2) cannot be used for determining the instants of bank selection, which occur at the zero crossing points of the total a.c. output current including the ripple components, because it does not include the fundamental current flowing in the shunt filter capacitor. However, by vectorially adding signals (1) and (2), after signal (1) has been filtered, there is obtained an accurate reconstruction of the converter fundamental as influenced by load transients.

In a preferred form of the invention, a current transformer is located on the conductor of the shunt branch of the converter output filter. This provides the raw signal (1) and is filtered by another low power filter. Signal (2) is derived from a separate current transformer on the load circuit conductor.

The use of a current transformer to sense the filter current for signal (1), with subsequent filtering, is preferable to the means disclosed in Pat. No. 3,593,106. There the equivalent signal is developed by using an integrating circuit which is fed from the voltage across the shunt branch of the filter. The integrating circuit so required is approximately the same in terms of cost and size as the use of a current transformer and separate filter. Preference for the latter form results from the fact that a filter removes all ripple and extraneous components having higher or lower frequencies than the fundamental and thus it reproduces the true fundamental current flowing in the output filter capacitor. Also, due to its resonant nature, it provides a continuous signal even if the output current is interruped for any reason. On the other hand an integrating circuit amplifies those components which have lower frequencies than the fundamental, including a d.c. component which may be present in the output, and therefore it cannot, in general, reproduce the true fundamental current in the output filter capacitor.

THE DRAWING

FIG. 2 is a set of waveforms useful in understanding the operation of the invention.

PREFERRED EMBODIMENTS

Figure 1:
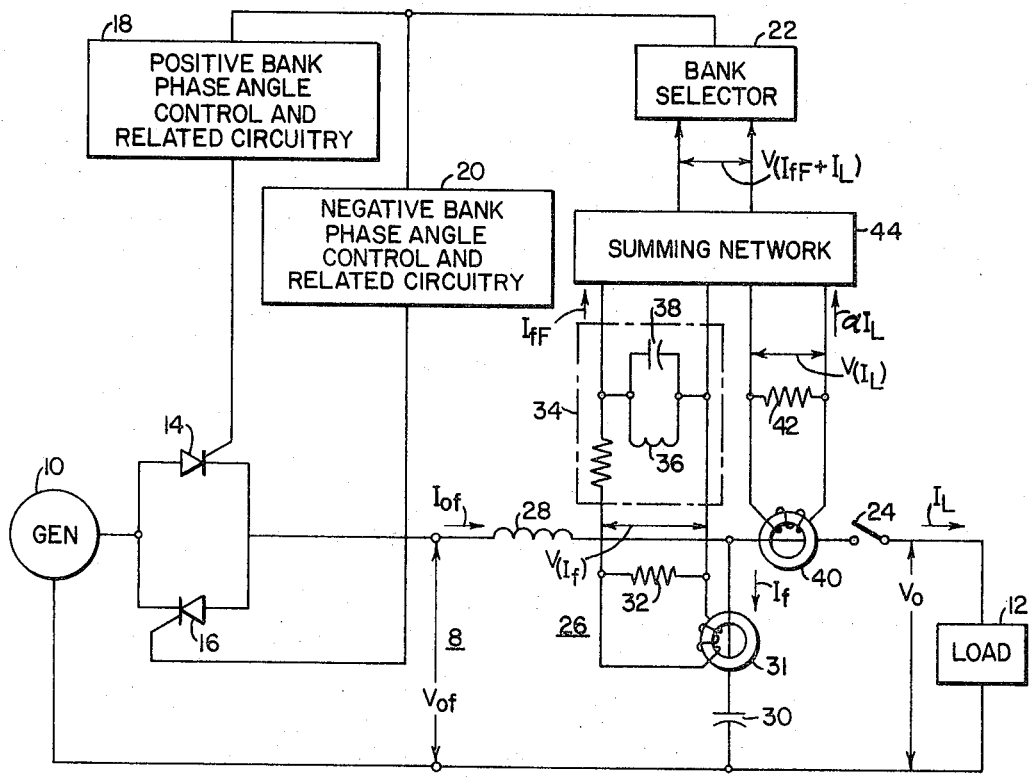
FIG. 1 is a circuit schematic of one embodiment of the present invention.

Since the present invention relates to an improved feature that may be used in known types of cycloconverter systems, the description herein will only generally describe otherwise known parts of the system. Reference may be made to above mentioned Pat. No. 3,568,033 for futher description of a system in which the invention may be used. That system includes apparatus for cycloconverter bank selection with a means for reconstructing a form of converter fundamental current that may be replaced by the apparatus of this invention. Other features of cycloconverter systems which may use the present invention have been described in Pat. Nos. 3,585,485 and 3,585,486, both issued June 15, 1971, the former by L. Gyugyi, J. Rosa and B. R. Pelly and the latter by L. Gyugyi and B. R. Pelly. Reference to these patents is, of course, merely by way of example as the invention is useful in a variety of cycloconverter systems as will be apparent to those skilled in the cycloconverter art.

FIG. 1 shows a cycloconverter system 8 for delivering controlled frequency power from a source of different or variable frequency, illustrated by generator 10, to a load 12. Positive and negative banks of gate controlled switching elements, here represented by single thyristors 14 and 16, respectively, that are connected in inverse parallel arrangement between the source 10 and load 12.

The firing of switch banks 14 and 16 is controlled by some means such as a positive bank phase angle control 18, connected to the gate of the thyristor of bank 14, and a negative bank phase angle control 20, connected to the gate of the thyristor of bank 16. A bank selector 22 applies control signals to phase angle control circuits 18 and 20.

For simplicity, FIG. 1 illustrates only a single output phase from source 10 and single thyristors in each of the switch banks. It will be understood, however, that the invention applies to multiphase cycloconverters which may involve a multiphase source and load and a plurality of switching elements in each switch bank in accordance with known practice as well as additional known features not detailed here. Each phase of a multiphase system may use the present invention.

The purpose of the cycloconverter system 8 is to apply to load 12 a controlled frequency alternating voltage $V_o$ continuously during periods in which the load is connected to the system, as by closing switch 24. Waveform A of FIG. 2 shows the type of waveform desired for the output voltage $V_o$, for a single phase, and is in the form of a clean sinusoidal wave.

As is known, the raw output voltage wave of the cycloconverter, $V_{of}$, as developed by switch banks 14 and 16, is not, however, in the desired form for $V_o$. The raw converter output voltage, $V_{of}$, has a fundamental component $V_o$ as well as ripple harmonics resulting from the inherent operating characteristics of the switch banks.

In accordance with known practice, a filter 26 is connected between the switch banks 14 and 16 and the load 12 to remove ripple harmonics. As is typical in prior practice, filter 26 includes an inductor 28 in series with the load and a capacitor 30 in parallel with load.

The total output current of the cycloconverter $I_{of}$ with all constituents considered is illustrated by waveform B in FIG. 2. This consists of the current flowing in the filter capacitor 30 illustrated by waveform C, and the load current which flows in load 12 after closing switch 24, illustrated by waveform E. It is to be noted that practically all ripple harmonic currents flow in the output filter capacitor 30.

Since proper operation of bank selector 22 requires a control signal proportional to output current $I_{of}$, without the ripple components, that control signal is developed by the improvement of this invention. The current $I_f$ in the capacitor 30 is sensed, such as by current transformer 31 whose primary is a conductor connected to one side of capacitor 30 and whose secondary or sensing winding has a resistor 32 connected across it to develop a voltage $V(I_f)$ that is proportional to $I_f$. The sensed waveform is applied to a filter 34, including an inductor 36, a capacitor 38 and a resistor 46 to remove ripple harmonics and produce a filtered waveform $I_{ff}$ as shown in waveform D. Elements 36 and 38 together exhibit a characteristic resonance that provides a self-sustained output even upon interruption of the input to filter 34. The load current $I_L$ is sensed by another current transformer 40 whose primary is the conductor connected to the load and whose secondary or sensing winding is connected across a resistor 42 to develop a proportional voltage $V(I_L)$ and a current proportional to $I_L$, that is, having the same form as waveform E.

The waveforms representing $I_{fF}$ and $I_L$ are vectorially added by a summing network 44, which may take one of various known forms of networks for adding waveforms. The output of the summing network 44, $V(I_{fF} \& I_L)$, as shown in waveform F, is applied to bank selector 22. As can be seen by comparing waveforms B and F, the latter includes the fundamental component of the former, including distortion resulting from load transients, but without ripple harmonics and is the desired control signal.

The bank selector 22, as discussed in abovementioned Pat. No. 3,568,033, includes means to detect zero crossings of the waveform applied to it, which in this case is waveform F. Firing pulses or logic signals from bank selector 22 to the positive and negative bank firing control circuits 18 and 20 are shown in waveforms G and H, respectively and are defined by the zero crossings of waveform F.

While FIG. 1 relates the use of the invention to form a signal useful in a bank selector circuit, the signal $V(I_{fF} + I_L)$ may be put to other uses. For example, such a control signal is useful to operate an output phase balancing circuit and an output current limiting circuit.

We claim:

1. In a cycloconverter system having positive and negative banks of gate controlled switching rectifier elements which are gated by firing circuits to convert a first alternating waveform from a source into a second alternating waveform that characteristically includes a desired fundamental frequency component and also harmonics of the fundamental component, which harmonics are substantially removed by a filter including a capacitor and the fundamental component is applied to a load connected across the filter capacitor, the improvement comprising: apparatus to derive, for control purposes, a signal that corresponds to the referred to fundamental component of the said alternating output current wave, including any distortion resulting from load switching and load nonlinearity, so as to permit detection of zero crossing points thereof, said apparatus comprising first means to develop a current proportional to alternating current in the filter capacitor and independent of load transients, second means to develop a current proportional to alternating current in the load, and third means to add vectorially said alternating currents from said first and second means, said filter capacitor being connected in a circuit branch across the load, said first and second means to develop currents comprising current transformers respectively associated with conductors in series with the filter capacitor in the branch across the load and with the load, and further comprising an additional filter to filter the current from said first means before reaching said third means.

2. The subject matter of claim 1 wherein: said additional filter includes inductive and capacitive elements that together exhibit a characteristic resonance that provides self-sustained output therefrom even upon interruption of the input thereto.

3. The subject matter of claim 1 wherein: said control signal is applied to a bank selector circuit for detection of zero crossings of the output current of desired frequency, said bank selector circuit being associated with said firing circuits.

* * * * *